Aug. 8, 1939.  E. W. MILLER  2,168,488
WORK PLACING METHOD AND MEANS FOR GEAR CUTTING MACHINES
Filed Dec. 12, 1935    3 Sheets-Sheet 3

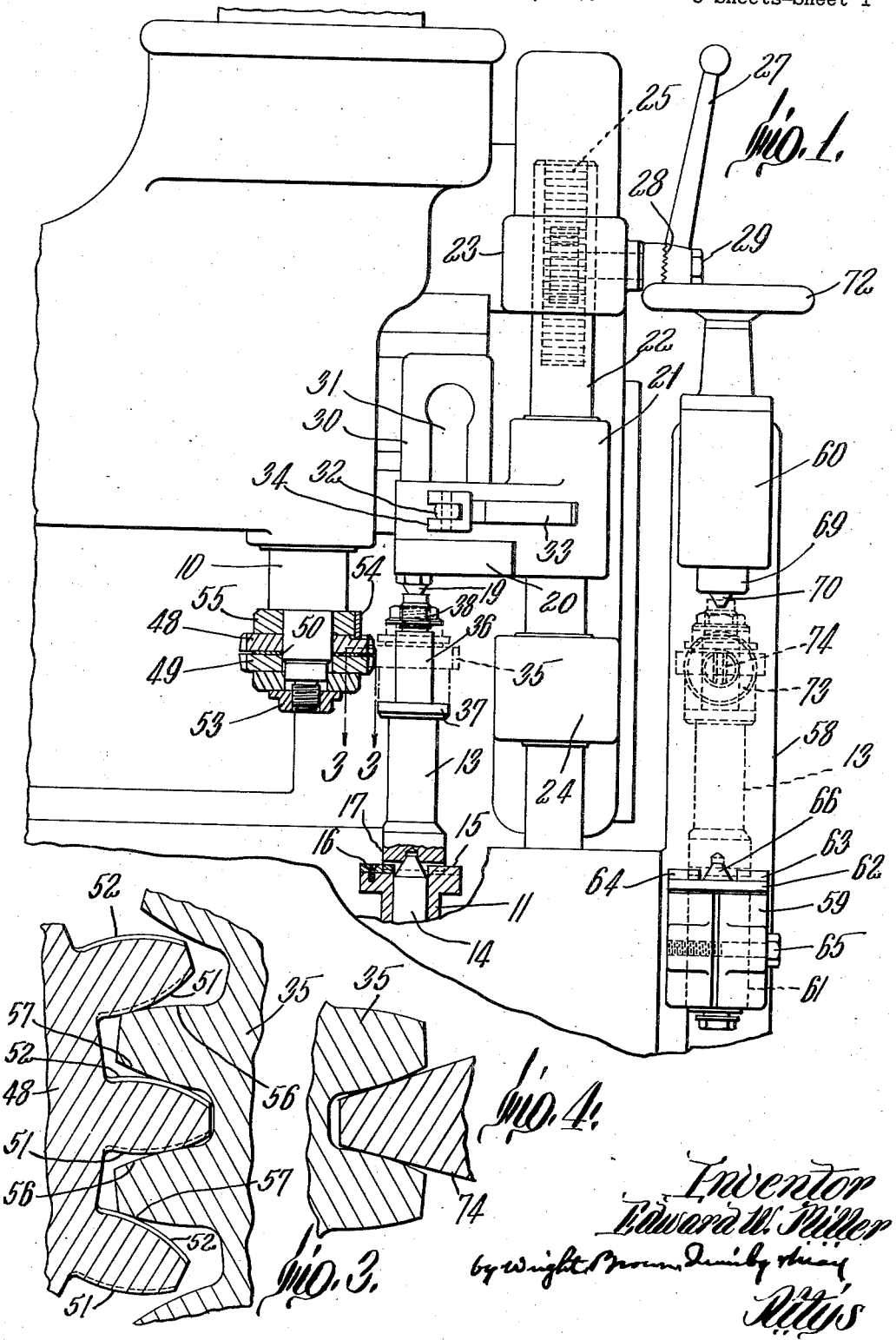

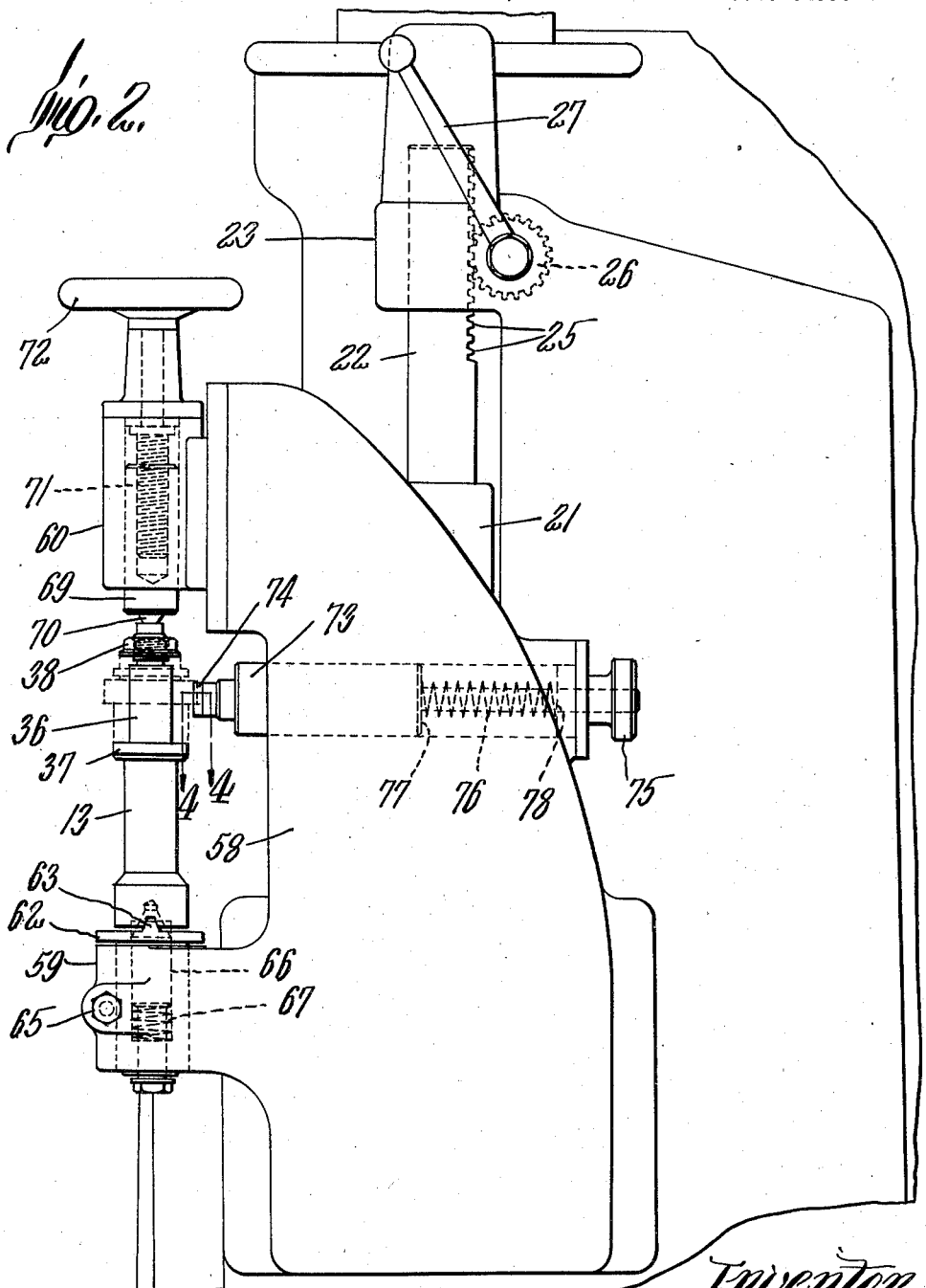

Inventor
Edward W. Miller

Patented Aug. 8, 1939

2,168,488

UNITED STATES PATENT OFFICE 2,168,488

WORK PLACING METHOD AND MEANS FOR GEAR CUTTING MACHINES

Edward W. Miller, Springfield, Vt., assignor to The Fellows Gear Shaper Company, Springfield, Vt., a corporation of Vermont Application December 12, 1935, Serial No. 54,066

18 Claims. (Cl. 90—9)

The present invention relates to gear cutting or finishing machines, and particularly those of the shaper type, in which a gear-like cutter generates conjugate tooth forms in the work piece by a combination of relative movements of reciprocation in the direction of the cutter axis and rotation or revolution in the manner of intermeshing gears. It is chiefly concerned with the provisions for mounting the work in correct position to be operated on by the cutter. The operations contemplated in this connection are those of finishing to exact form and dimensions a previously roughed out gear, either by a single cutter or a plurality of cutters with overlapping teeth and opposed cutting edges; but certain of its phases are useful also in the initial or original cutting of teeth in a gear blank.

The main features of the invention comprise interchangeable means by which a gear of any type, whether a single gear or one or more of the units of a cluster gear, and whether designed to be mounted rotatably on a shaft, or provided with a shaft of its own, may be connected with a work spindle in a location between the limits of travel of the cutter, whether the operation performed is original or finish cutting, and further comprises a means and method by which a cut gear may be angularly related to the cutter so as to cause equal amounts of stock to be removed from both sides of its teeth in the finishing cut and to bring like work pieces into the same relationship with a minimum of difficulty and time expenditure. These and further particulars in which the invention consists can best be explained in connection with a concrete embodiment of the invention. One such embodiment, together with alternative forms of one of its members, is shown in the accompanying drawings, in which, Fig. 1 is a front elevation (with certain parts shown in section) of so much of a gear shaping machine as shows the novel features of this invention;

Fig. 2 is a side elevation of the same;

Figs. 3 and 4 are fragmentary sectional views showing certain of the steps followed in effecting the adjustments with which one phase of the invention is concerned; these figures being enlarged views of section taken, respectively, on line 3—3 of Fig. 1 and line 4—4 of Fig. 2;

Like reference characters designate the same parts wherever they occur in all the figures.

In these drawings, 10 represents the cutter spindle of a gear shaping machine and 11 represents the work spindle. It may be understood without further illustration that the cutter spindle is reciprocated and that both spindles are rotated at speeds in harmony with one another by mechanisms such as those with which the commercial Fellows gear shaping machines are equipped. It is well known that such mechanisms include geared connections, either direct or indirect, between the cutter and work spindles which, in all normal conditions, prevent rotation of either independently of the other. That is, while special means may be provided to permit disconnection of either spindle from its driving means for independent adjustment, yet in normal operating conditions no possibility of independent rotation exists. This fact must be understood in order fully to appreciate the utility of the adjusting means later described.

One purpose of the machine is to provide capacity for mounting work pieces differing widely from one another in length so that the parts of each to be operated on by the cutter may occupy approximately the same position with respect to the limits of travel of the cutter, to avoid necessity of changing the position of the cutter path or the length of its path otherwise than may be needed to accommodate gears of greater or less length. With a machine in which the cutter and work spindles are vertical, such as the one here shown, this means that the different work pieces must be mounted at approximately the same height.

Figures 5, 6:
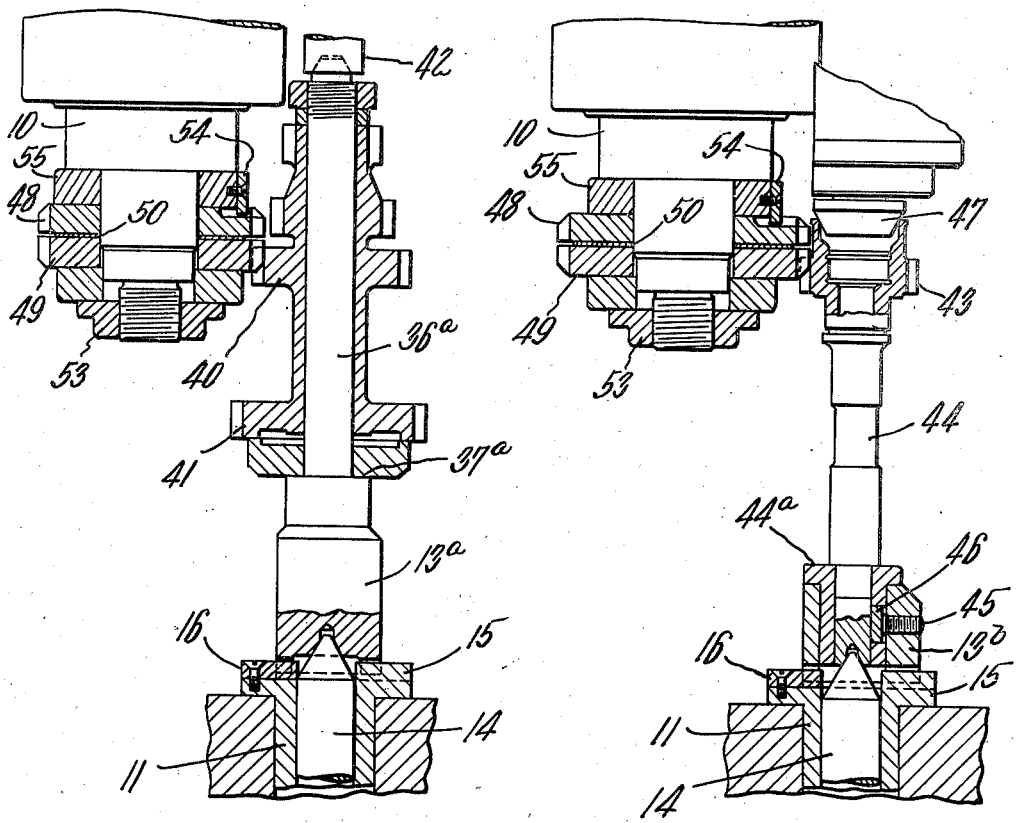
Fig. 5 is a fragmentary sectional view showing a variation of the work supporting means adapted to support a cluster gear.
Fig. 6 shows another variation of supporting means adapted to hold a shaft gear in position to be cut.
Figure 5A:
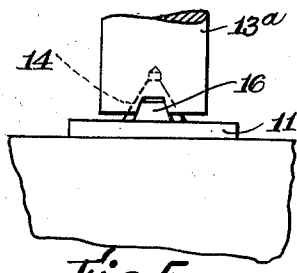
Fig. 5a is a fragmentary side elevation showing the coupling between the work spindle and work holding arbor.

In my pending application Serial No. 627,730, filed August 6, 1932, I have shown one means for achieving this result, which consists in shifting or adjusting the work spindle to different heights. According to the present invention I have devised a different means for achieving the same result in a simpler and easier way, which has other advantages also. I have here mounted the work spindle with its upper end sufficiently far below the planes between which the cutter travels to accommodate any of the gears within the range for which a given machine is devised, and have provided interchangeable arbors adapted to be coupled with the work spindle at one end and centered at the opposite end by an adjustable fixed bearing or dead center. One of such arbors is shown at 13 in Figs. 1 and 2. Its lower end is provided with a central tapered recess and a diametral groove or slot to receive respectively the tapered end of a centering pin 14 and alined ribs 15 and 16 on the spindle (Figs. 1 and 5a). Such pin is closely fitted slidingly in the spindle coaxial therewith and is supported yieldingly by a spring in the spindle. The ribs 15 and 16 project from the upper face of the spindle in alinement diametrally of the spindle with one another and are beveled to fit the tapered sides of the slot in the arbor.

On opposite sides of the rib 16 are shoulders which fit a flattened side 17 of the arbor base and permit the arbor to be engaged with the spindle and its centering pin in only one angular position.

A stationary bearing member or dead center 19 is mounted in axial alinement with the spindle to engage and center the upper end of the arbor. The dead center shown in Fig. 1 is a cone adapted to enter a conical recess in the end of the arbor. It is secured to the under side of a carrier 20 which is adapted to be raised and lowered for placement and removal of the arbor and to accommodate interchangeable arbors of different heights. This carrier in the present illustration is an arm protruding from a hub or sleeve 21 fixed to an upright bar 22 fitted to slide endwise in guides 23 and 24 and having rack teeth 25 on one side with which a pinion 26 meshes. An operating handle 27 is connected adjustably by clutch 28 and clamp nut 29 with the shaft of the pinion.

The arm or holder 20 is additionally guided, and clamped in position to hold the dead center 19 against displacement, by a fixed guide 30 having a longitudinal undercut slot 31. A bolt 32 passes through the arm and its head occupies the undercut grooves in the sides of the guideway. A clamp lever 33 has a forked end 34, the branches of which embrace the protruding end of the bolt and are pivoted thereto and have cam faces eccentric to the pivot arranged to bear on the outer face of the arm. When this lever is turned to the position shown in Fig. 1, the bolt head is pulled outward against the undercut lips of the slot and the rear face of the arm is pressed tightly against the outer face of the guide.

The arbor 13 is adapted to support a work gear, (or a master gear as later described) in the position shown by broken lines at 35, and is made with a reduced shank 36 to enter and fit the hole of such a gear, and a flange 37 to support the gear or a disk on which the gear is supported. The extremity of the arbor is threaded and is fitted with a nut 38 to bear on the upper end of the gear, either directly or through a washer or filler piece. An alternative arbor 13a adapted to support a cluster gear is shown in Fig. 5. This arbor is essentially like the arbor 13 but differs in the details that its shank portion 36a is long enough and its shoulder 37a is low enough to position the unit 40 of a cluster gear at the height of the cutter. To support the unit 41 of this gear in cutting position, another arbor having a longer shank portion and a shoulder in a lower position is substituted and the cluster gear mounted upon it in inverted position. Fig. 5 shows also a variation consisting in the substitution of a recessed pivot bearing 42 for the conical center 19 to admit the tapered end of the arbor. That is, dead centers of either external or internal form may be substituted for one another on the holder 20.

Shaft gears, such as the gear 43 integral with the shaft 44 shown in Fig. 6, may be mounted in the machine by substituting an arbor base 13b for the arbor 13, and securing the extremity of the shaft centrally in it either directly or through an adapter 44. The arbor base here is essentially like the bottom end of the arbor 13 or 13a, and the gear shaft is secured non-rotatably in it by a set screw 45 and a clamping block 46. Depending on the length of the shaft, its lower end may be centered either directly by the centering pin 14 of the spindle, or by engagement of the arbor base 13b or the adapter 44 with such centering pin. The upper end of the shaft gear is centered by a conical dead center 47 of suitable dimensions to engage the rim of the recess with which such pieces are customarily provided.

The dead centers here shown typify any and all bearings which are stationary in the sense of being immovable laterally, whether directly engaging the arbor or work piece with sliding contact, or equipped with a rotatable member arranged to engage and turn with the arbor, etc.

An important feature of this work supporting means is that the upper end of the work piece is in any case located and held in position by a stationary bearing which is mounted in exact alinement with the axis of the work spindle bearing, and the arrangement is such that the gear or gear unit in cutting position is near the stationary bearing and at a considerable distance from the rotating spindle. Hence such slight eccentricity of the spindle in its bearing as may result from the clearance necessarily provided to prevent binding and permit lubrication is divided at the working location to a fractional amount. To obtain this effect most efficiently, the work spindle and the supporting means for the stationary bearing are mounted in or on fixed parts of the machine base, and such adjustments as are needed to accommodate work pieces of different diameters are provided for by mounting the cutter spindle in a movable carriage according to well known principles of the Fellows gear shaper. The general principles of such a shiftable cutter carriage are shown in the Fellows Patent 1,478,472, December 25, 1923, as well as in my own prior application above referred to.

The features of the invention thus far described are equally useful for initially cutting gears from blanks or for finishing gears which have previously been cut to an approximation of final dimensions but with excess stock left on the sides of their teeth. A further part of the invention comprises means for adjusting a previously cut gear with respect to the cutter, and adjusting one cutter relatively to the other when two are used, so as to distribute the cutting effect equally, or substantially so, on both sides of the work piece teeth and on both edges of the cutter teeth, or equally between the teeth of two cutters.

The machine as shown here is equipped with two cutters arranged to operate in alternation with one another during opposite strokes respectively of the cutter spindle, according to the method set forth in the Trbojevich Patent 1,989,154, February 21, 1933. Such cutters are shown at 48 and 49 in Fig. 1 and a fragment of them is shown in an enlarged sectional plan view in Fig. 3. They are mounted on the spindle with their cutting ends facing toward one another and separated by a spacer 50 designed to provide between them the narrowest space practicable for flow of lubricant and escape of chips. They are angularly displaced, one with respect to the other, to cause the cutting edges 51 of the cutter 48 to extend laterally beyond the adjacent tooth faces of the cutter 49, and the relatively opposite edges 52 of the cutter 49 to protrude correspondingly from the teeth of cutter 48. Thus in the illustration shown, the cutter 48 acts during each down stroke and the cutter 49 during each up stroke of the spindle. After each stroke the spindle is turned slightly about its axis to right and left respectively so as to bring the cutting edges 51 and 52 alternately into position for cutting, and at the same time clear the inactive edges from contact with the work. The machine is equipped with means for that purpose substantially like or equivalent to the means for incrementally rotating the cutter spindle disclosed in my Patent 1,802,181, April 21, 1931, except that the entire incremental movement is effected in a single step instead of two steps. An equivalent means which may be used for the same purpose is shown in my pending application Serial No. 692,802, filed October 9, 1933, in which there is also shown a cam adapted to impart the entire movement each way in a single step. Still other alternatives may be used without departure from the invention here claimed.

In order to adjust the cutters so that the circumferential distance between the edges 51 and 52 of each overlapping pair of teeth will be enough less than the width of the tooth spaces in the work piece to permit such clearance and incremental angular movement, and also to place the work piece in correct angular relationship to the cutters, I employ a master gear in the manner which I will now describe.

A master gear is provided for each work piece of different diameter and pitch, and is like the work pieces in diameter and pitch but differs in that its teeth are thicker or wider than the final dimensions of the gear to be finished by an amount at least equal to the total thickness of the stock to be removed in finishing, and preferably also by an additional amount as great as the clearance needed to avoid rub of the cutter edges on their respective inactive strokes. The bore of the master gear is closely fitted rotatably to the arbor on which the work gear is to be mounted. It is placed on this arbor in substitution for the work gear in the location indicated at 35 in Fig. 1. The nut is placed on the arbor but not made tight, and the arbor is mounted in the machine as shown and previously described. At the same time the nut 53 on the cutter spindle which normally clamps the cutters is loosened enough to permit the cutter 49 to be turned. Cutter 48, however, is prevented from turning by a key 54 secured to the side of a disk 55, which is tightly fitted to the spindle. This key enters a recess in the adjacent end of cutter 48. Alernatively the cutter 48 may be otherwise withheld from turning on the spindle by any suitable means.

In the course of mounting the arbor in place, the master gear is manipulated so that it enters into mesh with the cutter teeth. It is turned by hand until the sides of one or more of its teeth bear on the edges 51 of one or more of the teeth of cutter 48. Fig. 3 shows the sides 56 of two of the master gear teeth thus in contact with two teeth of the cutter 48. Then the nut 38 of the arbor is set up to clamp the master gear tightly. Next the cutter 48 is turned to bring its cutting edges 52 into contact with the relatively opposite sides 57 of the contiguous master gear teeth; and the clamp nut 43 is set up to bind the cutters in their adjusted relationship.

This completes the cutter adjustment. But to obtain the desired cutting effect on the work piece gears, these latter must be mounted on the spindle so that their teeth and tooth spaces are symmetrically disposed with respect to the cutter tooth edges and to the angular movements given to the cutters for bringing the opposite edges of their teeth alternately into action. This relationship is obtained by mounting the workpiece gears on the arbor with their teeth in the same angular relationship to the driving slot of the arbor as that occupied by the master gear teeth. I have provided for this purpose a fixture 58, which may be, and preferably is, a bracket secured to or integral with the machine base, and is provided with alined bearings 59 and 60. The bearing 59 is divided on one side and contains rotatably a shaft 61 on the upper end of which is a table 62 having diametrically alined ribs 63 and 64 similar to the ribs 15 and 16 of the work spindle and adapted to engage the arbor in the same way. For convenience of description, the member thus mounted in the bearing 59 may be called a turn table. Its shank or shaft portion 61 may be clamped in the bearing 59 by tightening up the bolt 65 which passes through the divided parts of the bearing and is threaded into one of such parts. A tapered center pin 66, similar to the center pin 14, is coaxially mounted in the turn table and is supported by a spring 67 resting on a shoulder in the bearing, as clearly shown by Fig. 2. A like supporting means may equally be used for the center pin 14 of the work spindle.

The bearing 60 contains a slide 69 movable endwise in axial alinement with the turn table, and on the lower end of which is a stationary or dead center 70 similar to the center 19, and for which equivalent centering means like those shown in Figs. 5 and 6 may be substituted. Slide 69 is in threaded connection with a screw 71 having an operating handle or wheel 72, whereby the dead center may be advanced and withdrawn to engage and release the arbor.

A bar or plunger 73 is mounted sliding and rotatably in a bearing in the fixture bracket with its axis intersecting and perpendicular to the axial line of the turn table and center 70. It projects toward this axial line and is provided on its protruding end with a locating finger 74 in the form of a diametral rib with converging sides, adapted to enter between any two teeth of a master gear or work gear. The plunger is provided with a shank of reduced diameter which protrudes from the rear side of the fixture and carries an adjustable knob 75. A spring 76 surrounds the shank within the bearing and is compressed between a shoulder 77 on the plunger and an abutment 78 in the bearing whereby it normally projects the plunger toward the axis of the turn table and dead center. The knob serves as means for retracting the plunger, turning it about its axis to bring the locating finger into conformity with either a straight spur gear or a helical gear of any lead, and for adjustably limiting the distance to which the spring can project the finger.

The arbor, to which the master gear has been clamped in mutual adjustment with the cutters, is brought to this fixture and engaged between the turn table and dead center. At this time the clamp bolt 65 is loosened so that the turn table is free to turn, and it is turned with the arbor through the interengagement of its ribs and the slot in the arbor base, to any extent needed to bring any two teeth of the master gear into even bearing on opposite sides of the locating finger. The finger may be withdrawn while the arbor is being coupled and centered, and then advanced into engagement with the master gear. The divided bearing is then tightened on the turn table shaft so that the latter cannot turn. The gear to be finished is then substituted for the master gear.

Thereafter each gear to be finished is mounted on the arbor and turned into bearing engagement with the locating finger when the arbor is similarly related to the clamped turn table. A definite angle between the turn table rib and the locating finger having been established by the master gear, it follows that every work gear of the same diameter and pitch as the work piece thereafter positioned on the arbor in mesh with the locating finger, when the slot in the arbor is engaged with the rib on the turn table, must have the same angular relation between its teeth and the slot of the arbor as that between the master gear and the slot. Consequently when the arbor carrying the work gear clamped upon it in this relationship is coupled with the work spindle in the manner previously described, the work gear teeth have the same symmetrical relation to the cutter teeth and their oscillative movements as the original relation of the master gear.

All work gears are set up in this way. By using two arbors in rotation, a machine attendant can mount a work gear on either arbor while the machine is operating on a gear on the other arbor, and on the completion of the cycle, the change of one arbor for the other is effected in but a few seconds. No time need be spent in adjusting the work gear on the arbor while the machine stands idle, for the adjustment has already been made on the fixture 58, more accurately and satisfactorily than could be done directly on a work spindle or on an arbor permanently connected to the work spindle.

The extreme accuracy with which the work may thus be adjusted to the cutter insures equal distribution of the cuts on both sides of the work piece teeth and between the opposite cutting edges of the cutters. This enables a lighter finishing cut to be taken with assurance that both sides of the work piece teeth will be finished, than has been possible heretofore. This in turn lightens the duty required of the cutters and results in prolonging their useful life.

The method of adjusting the work is not limited to combination with the step of adjusting two opposed cutters or to use with such cutters. It is useful also in connection with a single cutter having cutting edges at opposite sides of its teeth, whether such opposite edges are at the same end of the cutter or at opposite ends. The procedure of adjusting a work gear with the aid of a master gear before described is exactly the same with a single cutter as with an assemblage of two opposed cutters. It is the same also with gears of the types shown in Figs. 5 and 6, except for the differences in the arbors used with different types of gears.

The reason for making the arbors so that they can be coupled with the work spindle and the turn table in only one position of angular rotation around the axis is to take care of gears having an odd number of teeth. Where the number of teeth is even, the correct adjustment would be obtained if the arbor were coupled in either of two positions 180 degrees apart. But with an odd number of teeth, if the arbor when carrying the work gear is coupled to the spindle 180 degrees from the position occupied when it carried the master gear, the work gear teeth would stand in the place of the tooth spaces of the master gear. So to meet all conditions I have made it impossible to couple the arbor to the spindle or to the turn table in any position but one. It will be understood that the diametral ribs 15 and 16, as also 63 and 64, represent only one of a number of possible means for effecting a torque transmitting connection between the spindle and the arbor or the turn table; and that the centering pin 14, and its equivalent, the pin 66, represent one of the possible means for alining the arbor with the spindle or turn table. They are illustrative and typical, rather than limiting, and many equivalents may be used within the scope of protection here claimed. Other variations in details of the elements and means here shown, including reversals, are intended to be protected under my claims.

The cutting and generating functions of the machine are essentially the same as those of the gear shaping machines described in the patents named in this specification, and in other patents. Helical gears may be cut or finished by giving the cutter spindle continuous back and forth rotational movements during its up and down strokes respectively. In finishing previously roughed out gears, there is no need for backing off movement of the cutter to avoid rubbing on non-cutting strokes, if a cutter having narrow teeth is used and is slightly turned from side to side after each stroke. But when the work holding means of the invention are used for initial cutting of teeth in a gear blank, or otherwise without incremental angular movement of the cutter, such backing off movement is necessary and may be effected by means such as those shown in my application Serial No. 627,730, or by an oscillating saddle and operating means on the principle of my application Serial No. 733,592, filed July 3, 1934. When either finishing or initially cutting a gear, preliminary depth feed may be omitted by using cutters which are devoid of teeth through an arc wide enough to admit the work piece into pitch line tangency with the cutter. The use of such an interrupted cutter without depth feed requires the toothless arc of the cutter to be turned toward the location of the work piece when the work piece is changed; but the adjustment of a roughed out gear with the aid of a master gear, as described, assures correct location of the work gear regardless of any rotation of the cutter and work spindles occurring after atjustment of the master gear on the arbor.

It will be clear from the references to prior patents and previously existing machines, that the principles of the invention for which I claim protection are not limited to a specific machine, but may be applied in many diverse situations and combinations. They may be used with a single cutter and with means for backing off the cutter to clear its teeth on noncutting strokes; or without backing off but with angular side movement for clearance, in the case either of a single cutter or of opposed overlapping cutters; or with an interrupted cutter or pair of opposed interrupted cutters and no depth feed; or with depth feed and a cutter or cutters fully supplied with equally spaced teeth throughout their entire circumference.

In any such machine, whether or not provided with depth feeding means, the bed or equivalent structure which holds the tool spindle, is adjustable to lengthen or shorten the center distance between tool and work. It is clamped immovably, after adjustment, in cases where no depth feed is provided and an interrupted cutter is used, which makes a very rigid association between the carrier or support for the arbor centering bearing. In one machine in which I have embodied the invention, the carrier for the center bearing is mounted in the base of the machine with provision for adjustment to accommodate longer or shorter arbors, and is additionally associated with clamping means for rigidly clamping it to the tool spindle holding bed in any position between the limits of its own adjustment for arbor length and of placement of the bed for different diameters of work or tool or both.

It is to be understood further that the novel principles of work supporting and centering means, including the provisions for adjusting the work angularly with respect to the tool, herein disclosed, are intended to be covered and protected in all possible applications for the finishing of gears where the tool spindle and work spindle are geared together, and whether the specific tools used are gear shaper cutters, or other tools suitable for finishing gears by lapping, burnishing, scraping, etc.

What I claim and desire to secure by Letters Patent is:

1. In a gear shaping machine, the combination with a work spindle having a coaxial centering member and off center coupling and driving means of a work arbor complementally formed to engage said centering member and driving means in coaxial extension of the spindle and in only one position of angular rotation about such axis, a turn table having centering and off center coupling means substantially like those of the work spindle adapted to engage the arbor in similar axial alinement and angular relationship, a supporting structure having a bearing in which said turn table is rotatable, means for locking the turn table to the supporting structure to prevent, and unlocking it to permit, rotation of the turn table, and a locating member mounted in fixed location at one side of the axial line of the rotatable member, adapted to effect interdental bearing with a gear on the arbor when the arbor is so coupled with said turntable.

2. The combination with an arbor adapted to hold rotatably, and to secure against rotation, a master gear and work gears, of means for effecting like angular relationship between all of such gears and the arbor comprising alined centering devices between which the arbor may be confined and by which it is placed in a definite position, a locating finger mounted at one side of such position in a fixed support, adapted to be withdrawn and projected into interdental bearing engagement with a gear on the arbor, and being normally prevented from displacement around the axis of the arbor, and coupling means arranged to hold the arbor in a definite position of rotation around its axis.

3. In a gear finishing machine, the combination with a work spindle having arbor-centering and rotation transmitting means adapted to engage one end of a work holding arbor, of a cooperative centering device mounted on the machine and adapted to engage the opposite end of such an arbor in axial alinement with the spindle, a turn table having arbor-engaging and rotation transmitting means substantially like those of the spindle, a centering device axially alined with said turn table and separated from it, said turn table and centering devices being adapted to engage the opposite ends of the same work holding arbor, and a positioning finger mounted at one side of the said axial alinement, adapted to be withdrawn and projected into interdental bearing engagement with a gear on the arbor, and being withheld from angular displacement about the axis of the arbor.

4. Apparatus for use in finishing gears by a machine having a reciprocative and rotatable tool spindle and a rotatable work spindle, comprising an arbor, coupling means between the work spindle of the machine and said arbor arranged to connect them in axial alinement and in only one position of relative angularity around such axis, the arbor being adapted to support a master gear and work gears interchangeably and rotatably, means on the arbor for locking such gears against relative rotation, a rotatable member having means for coupling the arbor in like alinement and angular relationship to that between the arbor and work spindle, means for locking said rotatable member against rotation, and a positioning finger constructed to bear simultaneously on at least two opposite tooth faces of any of such gears on the arbor when so coupled to said rotatable member, the positioning finger being mounted incapably of any angular displacement around the axis of the rotatable member.

5. The method of effecting substantial identity of angular relationship of a master gear and a work gear with the work spindle of a gear shaping machine, which consists in securing the master gear to an arbor having provisions for connection in axial alinement with the work spindle and in only one position of relative angular rotation about such axis, placing the arbor in the same coupled relationship to a supported rotatable member, bringing the master gear into interdental bearing with a positioning member which is incapable of shifting angularly about the axis of such rotatable member, at the same time turning the member about its axis to whatever extent is needed to bring the master gear into such bearing with the positioning member, and then substituting a work gear for the master gear on the arbor and bringing it into like bearing with the positioning member by rotation on the arbor if necessary, without rotating the said rotatable member.

6. The method of positioning a work piece in symmetrical relationship to gear cutter teeth for alternate action on opposite sides of its own teeth by the cutter teeth, which consists in connecting an arbor with the work spindle of the machine in axial extension thereof, and in a definite position of angular rotation about the spindle axis, placing rotatably on the arbor a master gear having teeth of greater thickness than the final dimensions of the work gear to be finished, bringing the teeth of such master gear into equal bearing on opposite sides with intermeshing cutter teeth, securing the master gear to the arbor, substituting a work gear for the master gear on the arbor in the same angular relationship to a given radius of the arbor as that previously occupied by the master gear, and reconnecting the arbor with the work spindle in the original angular relationship.

7. The method of positioning a work piece and cutters in a gear shaping machine for action alternately by two reciprocated and oscillated cutters mounted in axial alinement with their corresponding teeth angularly offset from one another, which consists in first adjusting the cutters on the cutter spindle of the machine with respect to a master gear on the work spindle of the machine so as to bring respectively opposite edges of overlapping teeth of the two cutters simultaneously into contact with respectively opposite sides of the same tooth space in the master gear, and then placing the work gear to be finished on the work spindle in substitution for the master gear and in the same angular relationship to a given radius of the work spindle as that occupied by the master gear upon completion of the cutter adjustment.

8. The method of positioning a work piece and cutters in a gear shaping machine for action alternately by two reciprocated and oscillated cutters mounted in axial alinement with their corresponding teeth angularly offset from one another, which consists in mounting a master gear on the work spindle, effecting a prescribed angular offset between the cutters by making contact between one tooth of the master gear and a tooth of one cutter and bringing the relatively opposite side of the overlapping tooth of the other cutter into contact with the adjacent side of the next tooth of the master gear, and substituting work gears for the master gear on the work spindle with their teeth in the same relationship to a given radius of the work spindle as that occupied by the master gear in the course of so adjusting the cutter.

9. The method of adjusting work and cutters in a gear finishing machine having opposed overlapping cutters, which consists in placing a work arbor on the work spindle in axial alinement and a given angular relationship therewith, securing a master gear on said arbor in tooth face contact with one cutter, adjusting and securing the other cutter to the cutter spindle in opposite tooth face contact with the master gear, substituting a work gear for the master gear on the arbor, establishing a like angular relationship between the work gear and arbor to that previously existing between the master gear and arbor, and connecting the arbor with the work gear secured thereon to the work spindle in the same relationship as that existing when the cutters and master gear were relatively adjusted.

10. The method of adjusting work and cutters in a gear finishing machine having cutter and work spindles, and overlapping cutters on the cutter spindle, which consists in relatively adjusting such cutters and a master gear angularly about the axes of the cutter and work spindles, respectively, to bring relatively opposite edges of overlapping teeth of the cutters into contact with correspondingly opposite boundaries of a tooth space in the master gear, exclusively, and substituting a work gear for the master gear in the same angular relationship to the work spindle as that previously occupied by the master gear.

11. The method of adjusting work and cutters in a gear finishing machine having cutter and work spindles, and overlapping cutters on the cutter spindle, which consists in coupling an arbor non-rotatably to the work spindle of the machine, relatively adjusting such cutters and a master gear angularly about the axes of the cutter spindle and said arbor, respectively, then clamping the cutters to the cutter spindle and the master gear to the arbor, removing the arbor and attached master gear, coupling the arbor with a rotatable member in like manner to its previous connection with the work spindle and bringing the master gear into interdental bearing with a locating finger while turning said member to any extent needed to effect such bearing, securing said member against rotation, substituting a work gear for the master gear on the arbor and bringing the work gear into like bearing with the locating finger by any necessary rotation on the arbor while the arbor is coupled to the locked rotatable member, securing the work gear to the arbor non-rotatably, and recoupling the arbor to the work spindle.

12. The method of adjusting a work gear for finish cutting in a gear shaping machine to accomplish substantially equal removal of stock from opposite sides of its teeth, which consists in placing a master gear having teeth thicker than the finish dimensions of the work gear on an arbor, coupling the arbor coaxially and non-rotatably to the work spindle of the machine, bringing the teeth of such master gear into mesh with the cutter of the machine so that such intermeshing teeth are in equal bearing at both sides, securing the master gear to the arbor, removing the arbor and secured master gear from the work spindle, bringing the arbor into like coupled connection with a rotatable member and the master gear into interdental bearing with a locating finger, securing said rotatable member against rotation, substituting a work gear for the master gear on the arbor, bringing the work gear into interdental bearing with the locating finger, securing the work gear non-rotatably to the arbor, and recoupling the arbor to the work spindle.

13. In the method set forth in claim 10, the use of a master gear having teeth of which the thickness is greater than the prescribed final tooth thickness of the gears to be finished.

14. In the method set forth in claim 10, the use of a master gear having teeth of which the thickness is greater than the prescribed final tooth thickness of the gears to be finished by an amount at least as great as the thickness of stock to be removed from roughed out gears in bringing such gears to final dimensions and form.

15. In the method set forth in claim 10, the use of a master gear having teeth of which the thickness is greater than the prescribed final tooth thickness of the gears to be finished by an amount at least as great as the thickness of stock to be removed from roughed out gears in bringing such gears to final dimensions and form, plus an additional amount sufficient to afford clearance between the work gear teeth and the inactive sides of the cutter teeth when the opposite sides of the cutter teeth are in action.

16. The method of adjusting a work gear for finish cutting in a gear shaping machine to accomplish substantially equal removal of stock from opposite sides of its teeth, which consists in providing a master gear like the work gear except that its teeth are thicker than the prescribed finished dimensions of the work gear teeth, placing such gear on an arbor which is applied coaxially and non-rotatably to the work spindle of the machine, bringing the teeth of such master gear into mesh with the cutter of the machine so that such intermeshing teeth are in substantially equal bearing on both sides, securing the master gear to the arbor, removing the arbor and secured gear from the work spindle, substituting a work gear for the master gear on the arbor with its teeth in substantially the same angular relationship to a given diameter of the arbor as were previously the teeth of the master gear, and recoupling the arbor to the work spindle in the same relative angular position as that occupied by the arbor when the master gear was brought into mesh with the cutter.

17. The method of bringing a work gear to be finished into such relationship with the cutter of a gear shaping machine that such cutter in the subsequent finishing operation will remove substantially equal amounts of stock from both sides of the work gear, which consists in providing an arbor having means for coaxial coupling with the work spindle of the machine in a given position of angular rotation about its axis, providing a master gear like the work gear except that its teeth are thicker than the prescribed finished dimensions of the work gear teeth, applying such arbor to the work spindle in axial alinement therewith and in such prescribed angular relationship, mounting the master gear on the arbor with one or more of its teeth in mesh with one or more teeth of the cutter of the machine, removing the arbor from the spindle and substituting a work gear for the master gear on the arbor with its teeth in substantially the same angular relationship to the coupling means of the arbor as the master gear when so meshed with the cutter.

18. The method of adjusting a work gear, for finishing, in symmetrical relationship to the teeth of the cutter of a gear shaping machine, which consists in providing an arbor having means for coupling with the work spindle of such machine in axial alinement therewith and in a given position of rotation around the axis thereof, providing a master gear like the work gear and having teeth thicker than the prescribed finished dimensions of the work gear teeth, applying the arbor to the work spindle in the prescribed angular relationship, locating the master gear on the arbor in such angular relationship to the coupling means thereof that its teeth are in substantially symmetrical meshing relationship to the teeth of the cutter and securing the master gear against rotation on the arbor, removing the arbor with the master gear secured thereto from the spindle and placing it in position such that the teeth of the master gear are engaged with a relatively nonrotatable locating finger, securing the arbor against rotation relatively to such locating finger, and mounting and securing a work gear on the arbor, in substitution for the master gear, and in like engagement with such lcating finger, while the arbor is so held.

EDWARD W. MILLER.